United States Patent [19]

Peng et al.

[11] 4,371,804
[45] Feb. 1, 1983

[54] PIEZOELECTRIC KNOCK SENSOR

[75] Inventors: Yuchi P. Peng, Noblesville; Gerald O. Huntzinger, Anderson; Melvin H. Hallmann, Middletown, all of Ind.

[73] Assignee: General Motors Corporation, Detroit, Mich.

[21] Appl. No.: 288,910

[22] Filed: Jul. 31, 1981

[51] Int. Cl.³ .......................................... H01L 41/10
[52] U.S. Cl. .................................. 310/321; 310/328; 310/338; 310/339
[58] Field of Search ............... 310/321, 323, 328, 329, 310/338, 339, 369

[56] References Cited

U.S. PATENT DOCUMENTS

| | | |
|---|---|---|
| 3,783,309 | 1/1974 | Alibert et al. .................. 310/338 |
| 3,843,898 | 10/1974 | Maciag ........................... 310/338 X |
| 4,225,802 | 9/1980 | Suzuki et al. .................. 310/321 |
| 4,254,354 | 3/1981 | Keem ............................. 310/329 |
| 4,305,013 | 12/1981 | Baier et al. ..................... 310/329 X |

Primary Examiner—William M. Shoop
Assistant Examiner—Peter S. Wong
Attorney, Agent, or Firm—Robert M. Sigler

[57] ABSTRACT

A broadly tuned self resonant knock sensor includes a piezoelectric element mounted on a central mounting stud. The element includes a generally annular vibratable portion having a variable radial dimension so as to exhibit resonant vibrations at a plurality of relatively closely spaced resonant frequencies essentially spanning an engine determined knock frequency band. In its preferred embodiment the element comprises a circular plate having piezoelectric generating means and an axis offset from the axis of the mounting stud.

5 Claims, 4 Drawing Figures

PIEZOELECTRIC KNOCK SENSOR

BACKGROUND OF THE INVENTION

This invention relates to a piezoelectric knock sensor for an internal combustion engine and specifically to such a sensor including an element adapted to resonate at a frequency characteristic of knock induced vibrations in the engine with which it is used. Such a sensor may be used in a system to measure knock in an internal combustion engine for the purpose of engine testing or fuel knock rating; or it may be used in an active closed loop knock control in which a knock affecting engine parameter such as engine spark timing is varied in response to the signal from said sensor to maintain knock at or below trace level.

There are many resonant piezoelectric knock sensors commercially available at the present time, almost all of them a self resonant design in which a circular piezoelectric element vibrates with substantially all its energy in a single resonant vibration mode at a predetermined frequency. The term "self resonant" is used herein to denote a resonant sensor in which the resonant frequency is a characteristic of some portion of the sensor alone and is not affected by the mass or vibration characteristics of the element on which the sensor is mounted. A sensor for which the resonant frequency depends in part on an interaction between the sensor and the object on which it is mounted is called an interactive sensor; and one example of such a sensor is shown in the U.S. Pat. No. 4,254,354 to John E. Keem, issued Mar. 3, 1981 and assigned to the assignee of this invention.

Knock occurs in an internal combustion engine when the spark ignited flame front of normal combustion within the combustion chamber compresses the unburned fuel mixture to the extent that this unburned mixture ignites spontaneously and generates acoustic cavity vibrations in the combustion chamber. These vibrations, which are dominated by certain audio resonant frequencies determined by the acoustic cavity resonance modes of the combustion chamber at the time of the knock event, cause the engine structure to vibrate in a similar manner and thereby cause the audible knocking or pinging sound for which the phenomenon is named. It has long been known that knock in a particular engine is generally characterized by one or more characteristic frequencies; and many proposed and actual knock measuring and control systems in the prior art make use of this fact in differentiating knock from other audible noises produced in engine operation. However, what has been very little discussed in the patent and other literature of the prior art and dealt with in a practical way by very few actual knock measuring or control systems is the fact that these characteristic knock frequencies are not firmly fixed for different specimens of the same basic engine, or for different cylinders of a single engine, or even for the same cylinder under different engine operating conditions. Since these frequencies are determined by the acoustic cavity resonances of the combustion chamber at the time of the knock event, they will thus vary somewhat with the volume of the combustion chamber at that time; and this volume will vary with the slightly varying dimensions of the engine parts within production tolerances as well as such combustion chamber volume and combustion characteristic parameters as spark timing, air-fuel mixture, engine inlet air temperature and atmospheric pressure, to name a few. Thus, in designing a practical knock detection and control system, one must be careful not to make any component of the system too narrowly resonant at a particular frequency.

The typical commercially available self resonant piezoelectric knock sensor generally comprises a mounting stud which may be attached to the engine or some component thereof, a case, a circular plate with piezoelectric voltage generating means and means for centrally or peripherally supporting the plate within but isolated from the case for self resonant vibration. The plate is supported in a symmetrical manner so that practically all of its vibrational energy appears in its first resonance mode, in which the periphery or center vibrates back and forth axially. This gives the sensor a sharply tuned, high Q resonance at a designated frequency, which is matched to the supposed knock frequency of the engine. Unfortunately, the sensor characteristic is so narrowly tuned that it does not sense all knock induced vibrations in all cylinders of each engine on which it is mounted at all times and therefore imparts a certain inconsistency of operation to the system in which it is used. Simple methods of broadening the response of the sensor such as the use of mechanical or electrical damping have the further undesirable effect of reducing the resonance peak so far that very little of the frequency selective advantages of resonance are attained. It would be desirable to produce a piezoelectric knock sensor which is mechanically resonant across a broader range of frequencies than the typical high Q resonant sensor while maintaining the high selectivity between those signals within the passband and those without. This kind of resonant characteristic is shown by the interactive knock sensor described in the aforementioned Keem patent; however, many designers would prefer to work, if possible, with a self resonant sensor, since the resonant frequency is determined solely by the resonating element and there is thus more freedom to design the case and electrical connectors of the sensor from the standpoint of minimum material and cost without concern for the effects of the design on the interactive resonant behavior of the sensor.

SUMMARY OF THE INVENTION

Therefore, it is an object of this invention to provide a self resonant piezoelectric knock sensor for an internal combustion engine exhibiting resonant vibrational response which substantially spans a broad frequency range.

It is a further object of this invention to provide such a sensor which responds resonantly to vibrations having frequencies within the entire frequency band associated with one acoustic cavity resonant mode of all examples of a particular engine design operated under the full range of expected engine operating conditions.

It is yet another object of this invention to provide a sensor according to the aforementioned objects which is inexpensive and easy to manufacture in high volume.

The invention which meets these objects is a piezoelectric knock sensor having a mounting stud adapted for attachment to an internal combustion engine and centrally supporting a vibrating plate which is shaped and mounted in such a way that it is multiply resonant at a plurality of resonant frequencies which substantially span the desired frequency band. In particular, the invention provides for a substantially radially symmetrical plate such as, for example, a circular plate, which is mounted on the stud with its axis offset from the axis of the stud by an amount sufficient to provide the desired multiple resonances. The resulting plate arrangement, when considered from the viewpoint of the axis or the periphery of the mounting stud, is a generally annular plate whose radial dimension varies in length around its periphery between a diagonally opposed maximum and minimum or otherwise radially symmetrical plate having an offset axis. The plate includes piezoelectric generating means effective to generate an electric voltage signal representative of the vibrations of the plate. Further details of the invention will be apparent from the accompanying drawings and following description of the preferred embodiment.

DESCRIPTION OF THE PREFERRED EMBODIMENT

Figure 3:
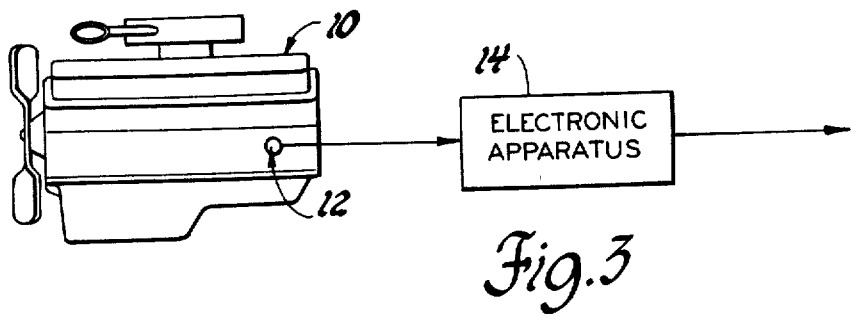
FIG. 3 is a drawing showing the sensor of this invention in its operating environment.

Referring to FIG. 3, an internal combustion engine 10 has a plurality of cylinders defining combustion chambers in which fuel charges are ignited by sparks at predetermined times synchronized with engine crankshaft rotation. Engine 10 is subject to possible knock events with resultant knock induced vibrations which cause similar vibrations in knock sensor 12. The electrical output signal from knock sensor 12 is provided to electronic apparatus 14 which may measure and display the knock or may further control an engine operating parameter such as spark timing to limit the knock to trace levels or lower. The location of the sensor 12 in FIG. 3 is not the only, nor even necessarily the best, location for the sensor, since the optimum sensor location may vary for different engines.

Figure 1:
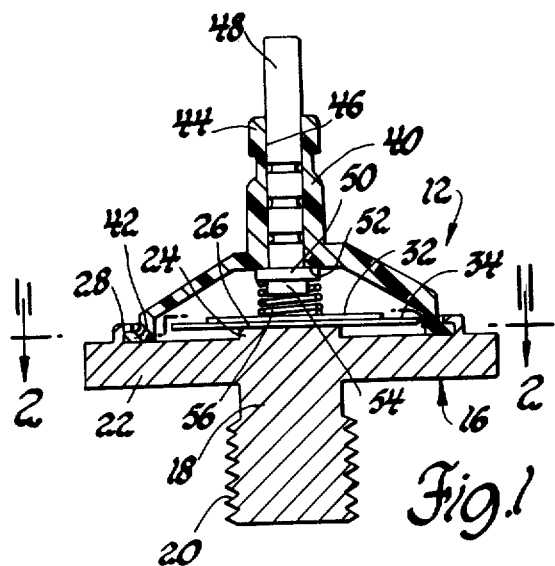
FIG. 1 is an axial cutaway view of a knock sensor according to this invention.
Figure 2:
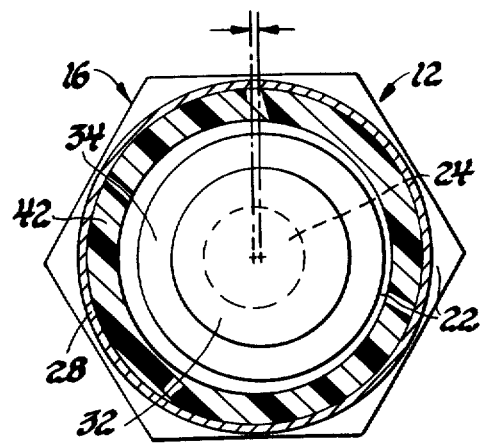
FIG. 2 is a section view along lines 2—2 in FIG. 1.

Referring to FIGS. 1 and 2, sensor 12 comprises a base portion 16 which includes a rigid mounting stud 18 provided with threads 20 in a standard pipe thread configuration for firm attachment within a similarly threaded depression in a component of engine 10. Base member 16 further comprises a coaxial hexagonal plate 22 formed integrally therewith, which plate provides wrench engageable peripheral surfaces for the installation of the sensor on the engine and also forms the bottom of the protective case. A portion 24 of mounting stud 18 projects axially beyond plate 22 and ends in a bounded circular flat surface 26 having a diameter, in this embodiment, of 8 millimeters. Around the periphery of plate 22 there exists a circular flange 28, which is provided to be bent down over and thereby retain an upper housing element yet to be described. The entire base member 16 may be formed from a single piece of steel by known manufacturing techniques.

A resonant piezoelectric element is a commercially available piezoelectric vibrator of the type having a circular piezoelectric disk 32 bonded to a circular brass plate 34 of somewhat greater diameter. Brass plate 34 is soldered to extension 24 of mounting stud 18 so that it is fixed thereto and in electrical contact therewith. A substantial portion of brass plate 34 extends radially outward past bounded surface 26 and is sufficiently resilient to respond to axial knock induced vibrations of engine 10 communicated through mounting stud 18. Piezoelectric disk 32 is bonded to brass plate 34 so as to be stressed by the vibrational bending of brass plate 34 and thereby develop a corresponding voltage signal across its upper and lower surfaces. The lower surface of piezoelectric wafer 32 is in electrical contact with brass plate 34 and therefore, through mounting stud 18, with the engine electrical common ground. Brass plate 34 measures 21 mm diameter by 0.2 mm thick; and piezoelectric disk 32 measures 15 mm diameter by 0.25 mm thick in this embodiment.

An upper housing element 40, which may be molded from a 30 percent glass filled polyester, includes a lower peripheral flange 42 abutting the upper surface of plate 22 and over which flange 28 of base member 18 is crimped. An upper cylindrical portion 44 of upper housing element 40 defines an opening 46 in which is inserted a terminal element 48 made of an electrically conducting material such as steel. Terminal element 48 has, near its lower end, a radial flange 50 which abuts an inner surface 52 of upper housing element 40. The lower end 54 of terminal element 48 projects past flange 50 to center the upper end of a coil spring 56, the lower end of which engages the upper surface of piezoelectric element 32. Spring 56 is primarily for electrical connection between piezoelectric element 32 and terminal 48 and is therefore made from an electrically conducting material such as steel. It is provided with sufficient force in its compressed condition to ensure good electrical contact with piezoelectric element 32 and with flange 50. The diameter of spring 56 is smaller than the diameter of the bounded surface 26 of mounting stud 18, so that spring 56 does not affect the vibrating characteristics of the portion of plate 34 that projects radially outward past said bounded surface.

Figure 4:
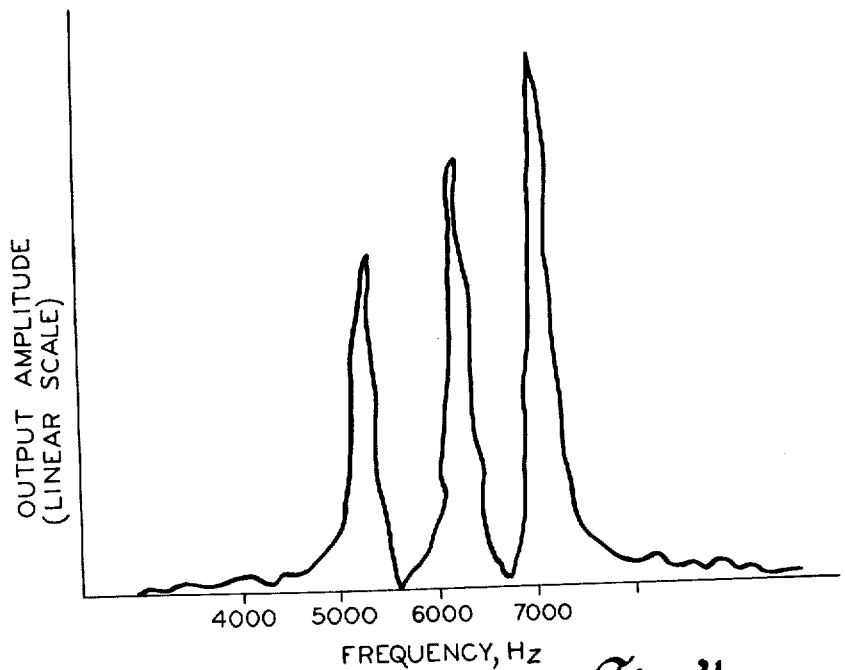
FIG. 4 is a graph of electrical output amplitude versus frequency for an embodiment of the sensor of this invention.

The structure described above defines a self resonant piezoelectric knock sensor in which the resonance characteristics are determined solely by the piezoelectric element and therefore primarily by brass plate 34 and the way in which it is mounted on mounting stud 18. The remainder of the elements of the sensor, such as plate 22, upper housing element 40, terminal 48 and spring 56 will have negligible affect upon the resonance frequency characteristics of the output signal. If brass plate 34 of the piezoelectric element were affixed to mounting stud 18 in a coaxially centered manner, the sensor would be sharply resonant at a frequency of approximately 6,560 hertz. However, the inventors have discovered that, if the axis of the brass plate 34 is shifted or offset from the axis of mounting stud 18 by a sufficient distance, that a plurality of resonance peaks will result. This phenomenon has been shown to be repeatable from one sensor to another. FIG. 4 shows a typical output characteristic for such a sensor with an offset of 0.5 mm. It can be seen that three separate peaks occur with characteristic frequencies of approximately 5,280 hertz, 6,160 hertz and 6,960 hertz. For the particular piezoelectric element used by the inventors, an offset of 0.25 mm proved to be insufficient to achieve this result, although a much lower second peak and the beginnings of a third peak appeared even with this offset. Larger offsets of 0.75 mm and 1 mm also produced three peaks of approximately the same frequencies.

One can see just from examining the frequency response plot of FIG. 4 that the sensor 12 will be an improvement over a singly resonant sensor if knock induced vibrations happen to be produced at the frequencies of the additional two peaks. However, what is not apparent from the Figure is that, although there appear to be two substantial gaps in the response of the sensor between the three peaks, testing of the sensor appears to indicate that the sensor responds to substantially all knock events produced by the engine. Therefore, it would appear that this sensor responds substantially as well as one in which those response gaps were not present, that is as if the response were continuous from approximately 5,000 to approximately 7,000 hertz. It is believed that the reason for this phenomenon is that a knock event in an engine such as engine 10 does not generate vibrations only at a single fixed frequency but over a range of frequencies. This may have to do with the volume of the acoustic cavity changing with piston motion during the knock event; or it may result from some complex interrelationship between the acoustic cavity resonances and the natural resonances of the engine structure or some other unknown frequency "smearing" characteristic of the process. However, regardless of the cause, tests indicate that, for all practical purposes in actual knock sensing, the three peaks of the characteristic curve shown in FIG. 4 substantially span the frequency range in which knock events generate ringing vibrations in the engine 10.

It will be apparent that, since the bounded surface 26 at the top of mounting stud 18 is circular, as is brass plate 34, the resilient or vibratable portion of plate 34 which extends radially outward from bounded surface 26 is generally annular in shape but with a radial dimension which varies circumferentially around the periphery between a diagonally opposed maximum and minimum. A finite element analysis of a model of such an annular plate shows that, if the radial dimension were constant—that is, if the plate were centrally mounted—a plurality of resonance modes having resonance frequencies within the desired frequency range would be present; however, there would be negligible energy in any resonance mode beyond the first. When the radial dimension of the annular plate is varied in the manner shown in the above description, however, substantial vibrational energy appears in the second and third resonance modes as well as the first. The second resonance mode can be described as one in which the plate is divided in half along a diameter and one-half bends upward while the other half bends downward. The third resonance mode can be described as one in which the plate is divided into quarters by two perpendicular diameters and alternate quarters bend upward and downward. It is apparent, then, that the offset of the center of plate 34, or in more general terms, the variation of the radial dimension of an annular plate between a diagonally opposed maximum and minimum in one circumference of the plate causes substantial energy to appear in multiple modes of vibration at somewhat closely related resonant frequencies which, in a piezoelectric knock sensor having a self resonant vibrating plate, produces a self resonant knock sensor having a resonant response which substantially spans the range of knock frequencies of a single acoustic cavity resonance mode expected from a particular engine design.

Although a specific preferred embodiment of this invention is described and shown herein, equivalent embodiments will naturally occur to those skilled in the art. Therefore this invention should be limited only by the claims which follow.

The embodiments of the invention in which an exclusive property or privilege is claimed are defined as follows:

1. A broadly tuned knock sensor for an internal combustion engine subject to knock-induced vibrations within an engine determined frequency band, the sensor comprising, in combination:
   mounting means defining a peripherally bounded surface having an axis, said surface, with the mounting means affixed to the engine, partaking of the knock induced vibrations; and
   a piezoelectric element affixed to the surface, the element comprising a resilient vibratable portion extending radially outward from the surface by different distances when measured in two non-parallel radial directions in the plane of the surface so that the element exhibits resonant vibrations in a plurality of modes having resonant frequencies relatively closely spaced within the engine determined frequency band to substantially span said band, the element further comprising piezoelectric voltage generating means effective to generate an electrical voltage signal representation of said vibrations.

2. A broadly tuned knock sensor for use with an internal combustion engine subject to knock-induced vibrations at frequencies within an engine determined frequency band, the sensor comprising, in combination:
   mounting means defining a peripherally bounded surface having an axis, said surface, with the mounting means affixed to the engine partaking of said knock induced vibrations; and
   a piezoelectric element affixed to the surface, the element comprising a resilient annular portion extending radially outward from the surface and having a radial dimension which varies circumferentially between a diagonally opposed maximum and minimum so that the element exhibits resonant vibrations in a plurality of modes having resonant frequencies relatively closely spaced within the engine determined frequency band to substantially span said band, the element further comprising piezoelectric voltage generating means effective to generate an electrical voltage signal representation of said vibrations.

3. A broadly tuned knock sensor adapted for mounting on an internal combustion engine subject to knock-induced vibrations at frequencies within an engine determined frequency band, the sensor comprising, in combination:
   a generally cylindrical rigid mounting stud adapted for rigid attachment to the engine for vibrational axial movement therewith; and
   a flexible plate having a shape generally symmetric about a central axis, the plate being centrally attached to the mounting stud and extending radially outward therefrom so as to be adapted for vibration therewith, the plate central axis being offset radially from the axis of the stud by an amount sufficient to produce sufficient resonant response in a plurality of resonance modes having resonance frequencies within the engine determined frequency band to essentially span the engine determined frequency band, the plate comprising a piezoelectric element adapted for flexure during said vibration and thus effective to generate an electrical signal corresponding to said vibrations.

4. A broadly tuned knock sensor adapted for mounting on an internal combustion engine subject to knock-induced vibrations at frequencies within an engine determined frequency band, the sensor comprising, in combination:

a generally cylindrical rigid mounting stud adapted for rigid attachment to the engine for vibrational axial movement therewith; and a flexible plate having a shape generally symmetric about a central axis, the plate being centrally attached to the mounting stud and extending radially outward therefrom so as to be adapted for vibration therewith, the plate central axis being offset radially from the axis of the stud by an amount, approximately 0.5 millimeters or greater, sufficient to produce sufficient resonant response in a plurality of resonance modes having resonance frequencies within the engine determined frequency band to essentially span the engine determined frequency band, the plate comprising a piezoelectric element adapted for flexure during said vibration and thus effective to generate an electrical signal corresponding to said vibrations.

5. A knock sensor adapted for use with an internal combustion engine subject to knock-induced vibrations at frequencies within an engine determined frequency band of approximately 5,000–7,000 hertz, the sensor comprising, in combination:

a rigid cylindrical mounting stud defining, at one axial end, a circular bounded surface having a diameter of 8 millimeters, the stud having another end adapted for rigid attachment to the engine; and a piezoelectric element fixed to the surface, said element comprising a circular brass plate having a diameter of 21 millimeters and thickness of 0.2 millimeters and a circular piezoelectric disk bonded concentrically to the plate and having a diameter of 15 millimeters and a thickness of 0.25 millimeters, the piezoelectric element having a central axis offset from the axis of the stud by at least 0.5 millimeters, whereby the sensor executes resonant vibrations at a plurality of frequencies essentially spanning said frequency band and is effective to generate an electrical output signal representation of said resonant vibrations.

* * * * *